(12) United States Patent
Cheng et al.

(10) Patent No.: US 10,990,219 B2
(45) Date of Patent: Apr. 27, 2021

(54) INTEGRATED CIRCUIT AND TOUCH DISPLAY APPARATUS TO SHORTEN A SETTLE TIME OF A COMMON ELECTRODE OF A TOUCH DISPLAY PANEL

(71) Applicant: Novatek Microelectronics Corp., Hsinchu (TW)

(72) Inventors: Huan-Teng Cheng, Hsinchu (TW); Wen-Yi Hsieh, Tainan (TW); Huang-Chin Tang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 15 days.

(21) Appl. No.: 16/451,021

(22) Filed: Jun. 25, 2019

(65) Prior Publication Data

US 2020/0183562 A1 Jun. 11, 2020

Related U.S. Application Data (60) Provisional application No. 62/775,389, filed on Dec. 5, 2018.

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01); *G06F 3/0412* (2013.01)

(58) Field of Classification Search
CPC ..... G06F 3/04164; G06F 3/044; G06F 3/0412
See application file for complete search history.

(56) References Cited

U.S. PATENT DOCUMENTS

| 9,223,425 | B1* | 12/2015 | Kim | G06F 3/0416 |
|---|---|---|---|---|
| 9,836,168 | B2 | 12/2017 | Fukushima | |
| 2013/0335342 | A1* | 12/2013 | Kim | G06F 3/0446 |
| | | | | 345/173 |
| 2018/0024678 | A1 | 1/2018 | Nitobe et al. | |
| 2018/0120996 | A1* | 5/2018 | Kang | G06F 3/045 |
| 2018/0329570 | A1 | 11/2018 | Chan et al. | |
| 2019/0042038 | A1* | 2/2019 | Lee | G06F 3/047 |

FOREIGN PATENT DOCUMENTS

CN 107978295 5/2018

OTHER PUBLICATIONS

"Office Action of Taiwan Counterpart Application", dated Apr. 27, 2020, p. 1-p. 4.

* cited by examiner

*Primary Examiner* — Laurence J Lee
(74) *Attorney, Agent, or Firm* — JCIPRNET (57) ABSTRACT

An integrated circuit and a touch display apparatus are provided. The integrated circuit is configured to drive a touch display panel. The integrated circuit includes a regulator. An output terminal of the regulator is employed as a first node to output a common voltage, wherein the common voltage is configured to be provided to at least one common electrode of the touch display panel. An input terminal of the regulator is coupled to a second node different from the first node to receive a feedback voltage.

30 Claims, 5 Drawing Sheets

INTEGRATED CIRCUIT AND TOUCH DISPLAY APPARATUS TO SHORTEN A SETTLE TIME OF A COMMON ELECTRODE OF A TOUCH DISPLAY PANEL

CROSS-REFERENCE TO RELATED APPLICATION

This application claims the priority benefit of U.S. provisional application Ser. No. 62/775,389, filed on Dec. 5, 2018. The entirety of the above-mentioned patent application is hereby incorporated by reference herein and made a part of this specification.

BACKGROUND

Field of the Invention

The invention relates to an electronic circuit, and more particularly, to an integrated circuit and a touch display apparatus.

Description of Related Art

In a full in-cell touch panel architecture, a common voltage (which is referred to as VCOM hereinafter) layer is divided into a plurality of electrode blocks, and a size of each common electrode block is adapted to serve as a touch sensing pad. In a touch sensing period, the common electrode blocks of the VCOM layer may be employed as touch sensing pads, so as to perform capacitive touch sensing. In a display driving period, the common electrode blocks of the VCOM layer may serve as VCOM electrodes. The common electrode blocks of the VCOM layer are connected to different output pins of a touch with display driver integration (TDDI) integrated circuit respectively through a plurality of wires (which are common voltage lines and referred to as VCOM lines hereinafter) separated from each other.

In a display driving period, the TDDI integrated circuit may provide common voltages to the VCOM electrodes through the VCOM lines. However, for a VCOM electrode which is far away from the TDDI integrated circuit (which is referred to as a far-end VCOM electrode hereinafter), a settle time of the VCOM voltage of the far-end VCOM electrode becomes longer as a resistance-capacitance (RC) loading of the VCOM line becomes larger. In addition, a time for display driving in the TDDI architecture has to be compressed to spare time for touch sensing, so that the time for display driving is shortened. Because the far-end VCOM electrode has a longer settle time, it is often late for a common voltage of the far-end VCOM electrode to be pulled back to a target voltage within the limited time for display driving, so that a situation of display abnormality occurs to pixels which are far away from the TDDI integrated circuit. Moreover, in the consideration of a factor that the signal toggling of a source line or a gate line couples to the VCOM line and the VCOM electrode, a difference between levels of the common voltage of the far-end VCOM electrode and the target voltage becomes larger as the settle time of the far-end VCOM electrode is longer, which may further cause sensor edge stripes visually.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides an integrated circuit and a touch display apparatus to shorten a settle time of a common electrode of a touch display panel.

According to an embodiment of the invention, an integrated circuit configured to drive a touch display panel is provided. The integrated circuit includes a regulator. An output terminal of the regulator is employed as a first node to output a common voltage, wherein the common voltage is configured to be provided to at least one common electrode of the touch display panel. An input terminal of the regulator is coupled to a second node different from the first node to receive a feedback voltage.

According to an embodiment of the invention, a touch display apparatus is provided. The display apparatus includes a touch display apparatus and an integrated circuit. The integrated circuit includes a regulator. An output terminal of the regulator is employed as a first node to output a common voltage, and the common voltage is configured to be provided to at least one common electrode of the touch display panel. An input terminal of the regulator is coupled to a second node different from the first node to receive a feedback voltage.

To sum up, in the integrated circuit and the touch display apparatus of the embodiments of the invention, the coupling node of the input terminal of the regulator in the integrated circuit can be set to be near to the common electrode of the touch display panel as much as possible. Thus, the settle time of the common electrode of the touch display panel can be shortened.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

Figure 1:
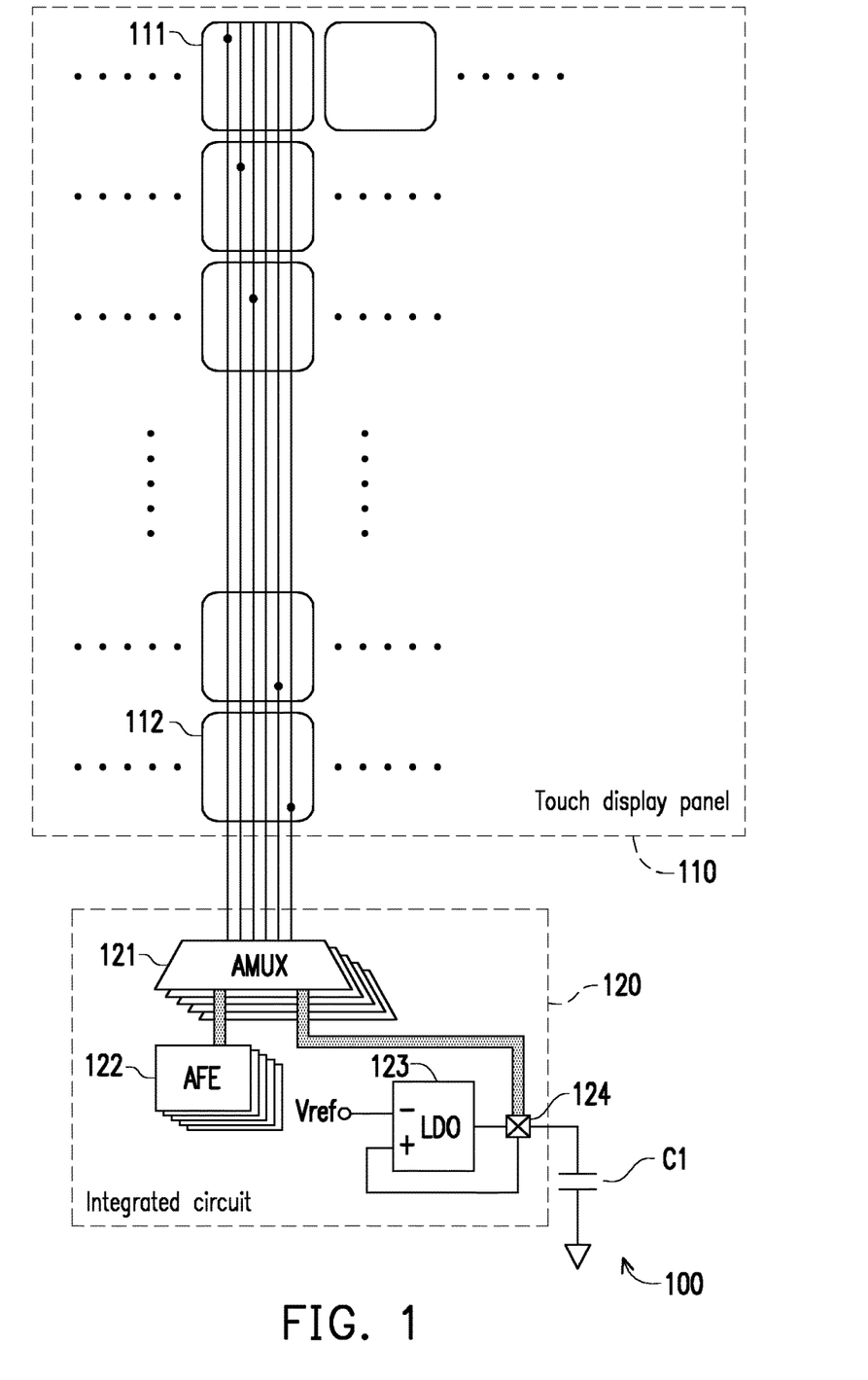
FIG. 1 is a schematic circuit block diagram illustrating a touch display apparatus according to an embodiment of the invention.

FIG. 1 is a schematic circuit block diagram illustrating a touch display apparatus 100 according to an embodiment of the invention. The touch display apparatus 100 illustrated in FIG. 1 includes a touch display panel 110 and an integrated circuit 120. The touch display panel 110 may be a full in-cell touch panel. In the touch display panel 110, a common voltage (which is referred to as VCOM hereinafter) layer is divided into a plurality of electrode blocks (which are referred hereinafter to as common electrodes, for example, a common electrode 111 and a common electrode 112 illustrated in FIG. 1), and a size of each common electrode is adapted to serve as a touch sensing pad. In a touch sensing period, the common electrodes of the VCOM layer may be employed as touch sensing pads (sensors) for performing capacitive touch sensing. In a display driving period, the common electrodes of the VCOM layer are employed as VCOM electrodes. The common electrodes of the VCOM layer are respectively electrically connected to different output pins of the integrated circuit 120 through a plurality of wires (which are common voltage lines and referred to as VCOM lines).

Based on a design requirement, the driving circuit 120 may be a touch with display driver integration (TDDI) circuit or other driving circuits. In the display driving period, the integrated circuit 120 may provide a common voltage to each of the common electrodes (for example, the common electrode 111 and the common electrode 112) of the display panel 110. However, for a common electrode which is far away from the integrated circuit 120 (which is referred to as a far-end common electrode, e.g., the common electrode 111 illustrated in FIG. 1), a settle time of a common voltage of the far-end common electrode becomes longer as a resistance-capacitance (RC) loading of the VCOM line becomes larger. In this case, a time required for pulling a voltage of the common electrode from another voltage level back to a level of a target voltage (e.g., a common voltage) is referred to as a settle time.

In addition, a time for display driving in the TDDI architecture has to be compressed to spare time for touch sensing, so that the time for display driving is shortened. Because the far-end common electrode has a longer settle time, it is often late for the voltage level of the far-end common electrode (e.g., the common voltage 111) to be pulled back to the target voltage (i.e., the common voltage) within the limited time for display driving, so that a situation of display abnormality occurs to pixels which are far away from the integrated circuit 120. Moreover, in the consideration of a factor that the signal toggling of a source line or a gate line couples to the VCOM line and the common electrode, a difference between the levels of the common voltage of the far-end common electrode (e.g., the common electrode 111) and the target voltage becomes larger as the settle time of the far-end common electrode is longer, which may further cause sensor edge stripes visually.

The integrated circuit 120 illustrated in FIG. 1 includes analog multiplexers (AMUXs) 121, analog front end (AFE) circuits 122 and a voltage regulator such as a low dropout (LDO) regulator 123. Output terminals of the AMUXs 121 are respectively coupled to different VCOM lines of the touch display panel 110, wherein the VCOM lines are respectively coupled to different common electrodes (for example, the common electrode 111 and the common electrode 112 illustrated in FIG. 1) of the display panel 110. The common voltage of each of the common electrodes is provided by the same LDO voltage regulator 123. An output terminal of the LDO regulator 123 is coupled to an ILB pad 124 of the integrated circuit 120, and the ILB pad 124 can be coupled to a regulation capacitor C1 on a flexible printed circuit (FPC). A first input terminal (a reference voltage terminal) of the LDO regulator 123 can be coupled to a reference voltage Vref. A second input terminal (a feedback voltage terminal) of the LDO regulator 123 can be coupled to the ILB pad 124 of the integrated circuit 120, so as to employ a voltage of the regulation capacitor C1 as a feedback voltage. In this architecture, the feedback voltage of the LDO regulator 123 is similar or close to the voltage of the regulation capacitor C1.

Figure 2:
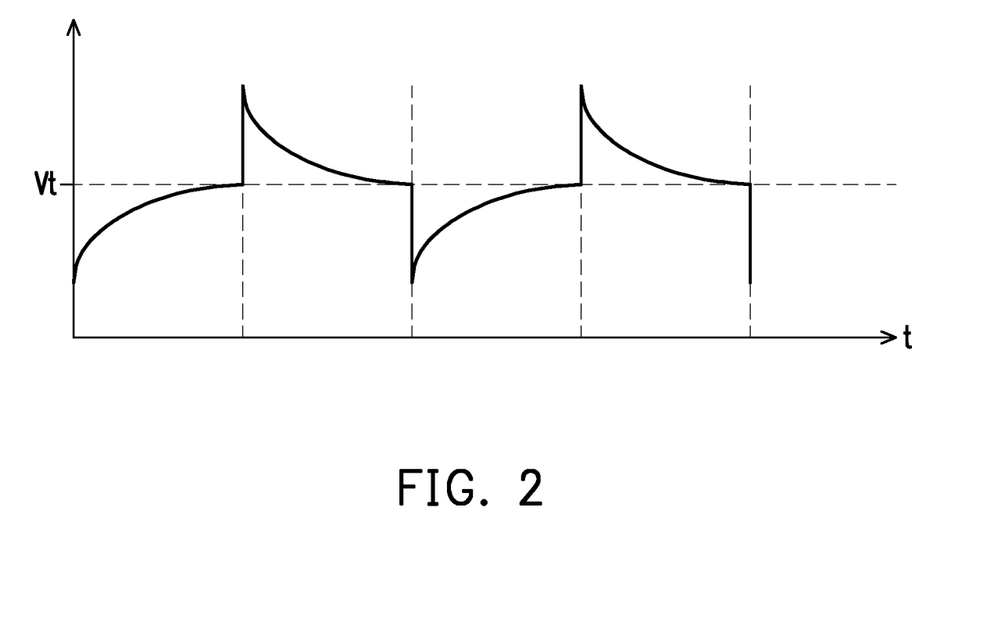
FIG. 2 is a schematic waveform diagram illustrating a voltage of the common electrode near the integrated circuit as depicted in FIG. 1 according to an embodiment of the invention.

FIG. 2 is a schematic waveform diagram illustrating a voltage of the common electrode near the integrated circuit 120 as depicted in FIG. 1 according to an embodiment of the invention. In FIG. 2, the horizontal axis represents the time t, and the vertical axis represents voltage levels. Referring to FIG. 1 and FIG. 2, for a voltage of the common electrode (e.g., the common electrode 112) near the integrated circuit 120, the feedback voltage (i.e., the voltage of the regulation capacitor C1) is applicable. Because a RC loading of the common electrode 112 is smaller, and a settle time of the common voltage is shorter, the voltage of the common electrode 112 may be immediately stabilized (return to a target voltage level Vt), as illustrated in FIG. 2.

Figure 3:
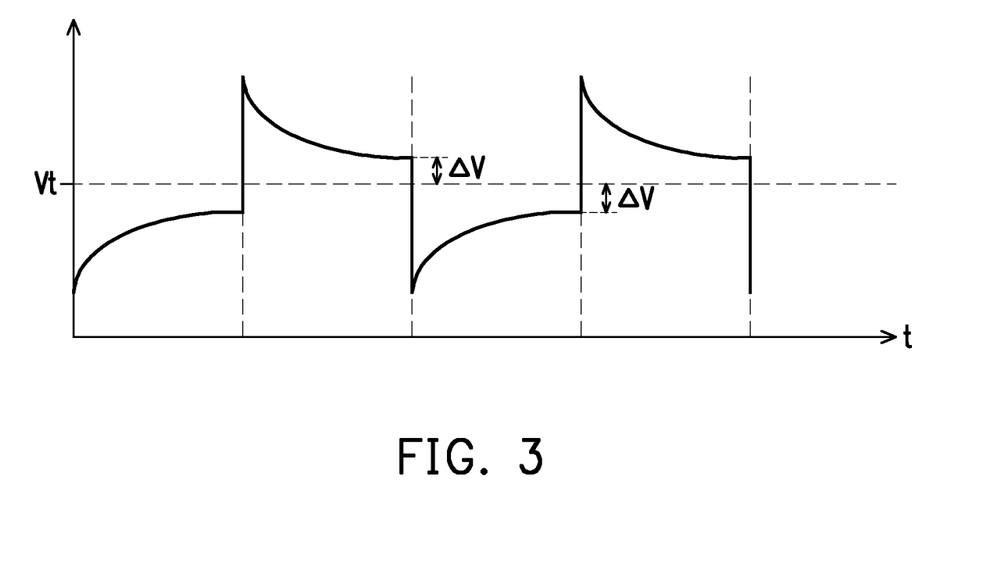
FIG. 3 is a schematic waveform diagram illustrating a voltage of the common electrode far away from the integrated circuit as depicted in FIG. 1 according to an embodiment of the invention.

FIG. 3 is a schematic waveform diagram illustrating a voltage of the common electrode far away from the integrated circuit 120 (which is the far-end common electrode, for example, the common electrode 111) as depicted in FIG. 1 according to an embodiment of the invention. In FIG. 3, the horizontal axis represents the time t, and the vertical axis represents voltage levels. Referring to FIG. 1 and FIG. 3, for the far-end common electrode (e.g., the common electrode 111), because a RC loading thereof is larger, and a settle time of the common voltage is longer, the voltage of the far-end common electrode may fail to be immediately stabilized (return to the target voltage level Vt), and thus, there is a voltage difference ΔV between the common voltage of the far-end common electrode and the target voltage, as illustrated in FIG. 3. In this situation, the common voltage of the far-end common electrode is unable to be optimized, which causes display abnormality to far-end pixels of the touch display panel 110.

Figure 4:
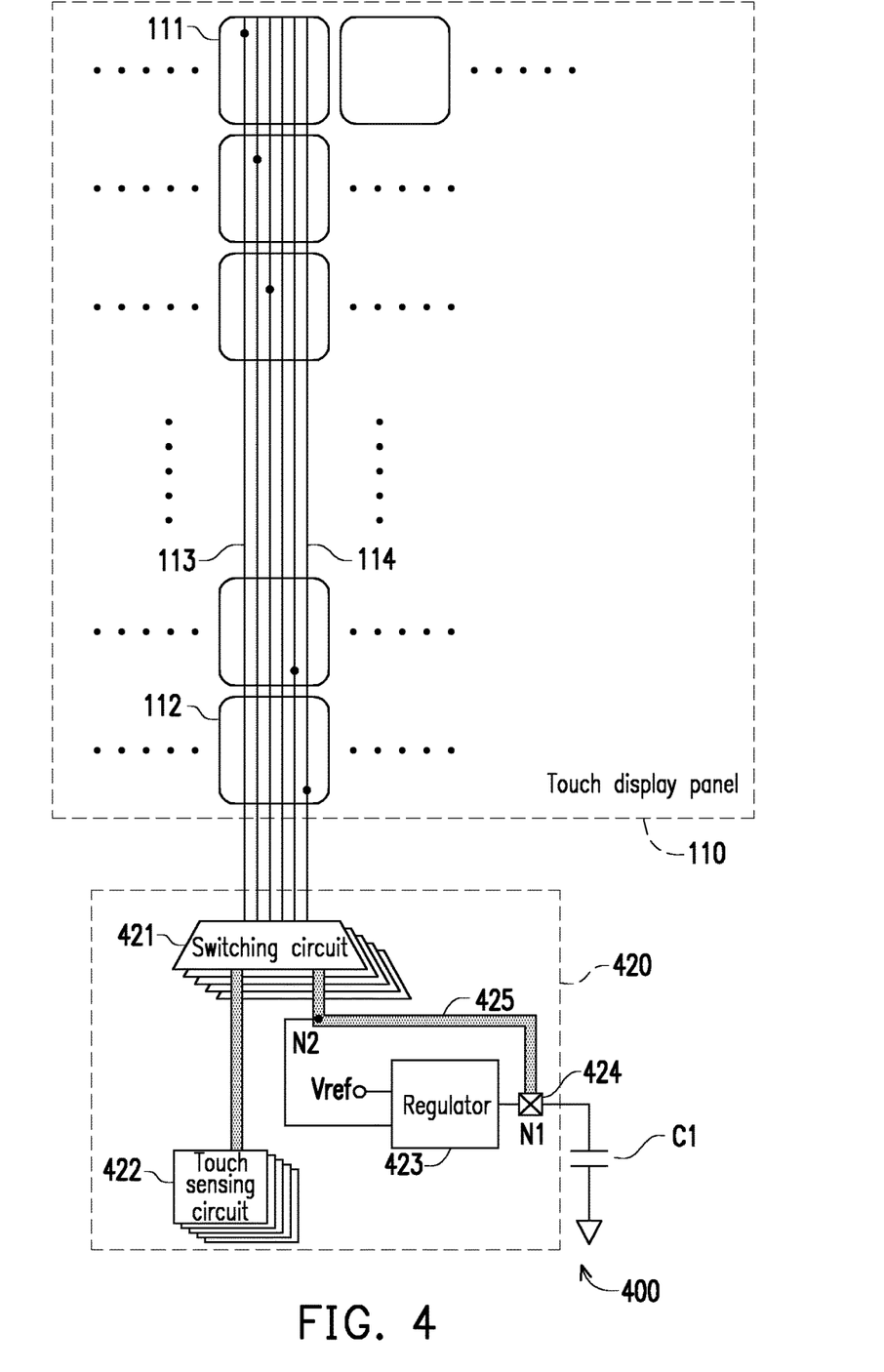
FIG. 4 is a schematic circuit block diagram illustrating a touch apparatus according to an embodiment of the invention.

FIG. 4 is a schematic circuit block diagram illustrating a touch apparatus 400 according to an embodiment of the invention. The touch display apparatus 400 illustrated in FIG. 4 includes a touch display panel 110 and an integrated circuit 420. An ILB pad 424 of the integrated circuit 420 is coupled to a regulation capacitor C1 on a printed circuit. The touch display panel 110, the ILB pad 424 and the regulation capacitor C1 may be inferred with reference to the descriptions related to the touch display panel 110, the ILB pad 124 and the regulation capacitor C1 illustrated in FIG. 1 and thus, will not repeated.

In the embodiment illustrated in FIG. 4, the integrated circuit 420 includes a switching circuit 421, a touch sensing circuit 422 and a regulator 423. A common terminal of the switching circuit 421 is coupled to at least a common voltage line of the touch display panel 110. The common voltage line is coupled to at least one of the common electrodes of the touch display panel 110. For example, the common voltage line 113 is coupled to the common electrode 111, and the common voltage line 114 is coupled to the common electrode 112.

In the embodiment illustrated in FIG. 4, a first selection terminal of the switching circuit 421 is employed as or coupled to a second node N2. A first terminal of a wire 425 is coupled to a first node N1. A second terminal of the wire 425 is coupled to the first selecting terminal of the switching circuit 421 (i.e., the second terminal of the wire 425 may be employed as the second node N2). In other words, the second node N2 is directly coupled to the first node N1 through the wire 425. Thus, the first selection terminal of the switching circuit 421 may receive a common voltage generated by the regulator 423. The common voltage may be transmitted by the wire 425 from the first node N1 and the second node N2 to the common electrode (e.g., the common electrode 111) of the touch display panel 110.

The touch sensing circuit 422 is coupled to a second selection terminal of the switching circuit 421. In the touch sensing period, the switching circuit 421 is configured to be switched to couple the common voltage line of the touch display panel 110 to the touch sensing circuit 422. In this circumstance, the touch sensing circuit 422 may sense whether a touch event occurs to the touch display panel 110 through the switching circuit 421, the common voltage line and the common electrode (e.g., the common electrode 111). In the display driving period, the switching circuit 421 is configured to be switched to couple the common voltage line of the touch display panel 110 to the first node N1 to receive the common voltage provided by the regulator 423. The switching circuit 421 may be implemented by using any routing circuit based on a design requirement. For instance, in some embodiments, the switching circuit 421 illustrated in FIG. 4 may be a multiplexer, a switch or any other routing circuit/element.

The regulator 423 may be implemented by using any voltage generating circuit based on a design requirement. For instance, in some embodiments, the regulator 423 illustrated in FIG. 4 may be inferred with reference to the description related to the LDO regulator 123 illustrated in FIG. 1. An output terminal of the regulator 423 is employed as the first node N1, and the first node N1 is electrically connected to the ILB pad 424 of the integrated circuit 420. An input terminal (a feedback voltage terminal) of the regulator 423 is coupled to (for example as shown, directly connected to) the second node N2 different from the first node N1 to receive a feedback voltage. According to a difference between the reference voltage Vref and the feedback voltage (i.e., the voltage of the second node N2), the output terminal of the regulator 423 may correspondingly output a common voltage. The common voltage is provided to at least one of the common electrodes (e.g., the common electrodes 111 and 112 illustrated in FIG. 4) of the touch display panel 110.

It should be noted that the wire 425 has a parasite resistance. Thus, when a current flows through the wire 425, a voltage level of the first node N1 is usually different from a voltage level of the second node N2. By being compared to the common voltage of the first node N1, the voltage level of the second node N2 is nearer to a voltage level at the common electrode 111. In comparison with the circuit illustrated in FIG. 1 in which the coupling node to which the input terminal (+) (the feedback voltage terminal) of the regulator 123 is coupled to is IPB pad 124, the coupling node (i.e., the second node N2) of the input terminal (i.e., the feedback voltage terminal) of the regulator 423 in the integrated circuit 420 is the second node N2, which is nearer to the common electrode 111 of the touch display panel 110 than the IPB pad. Thus, in the embodiment illustrated in FIG. 4, a settle time of the common electrode 111 of the touch display panel 110 may be shortened.

Figure 5:
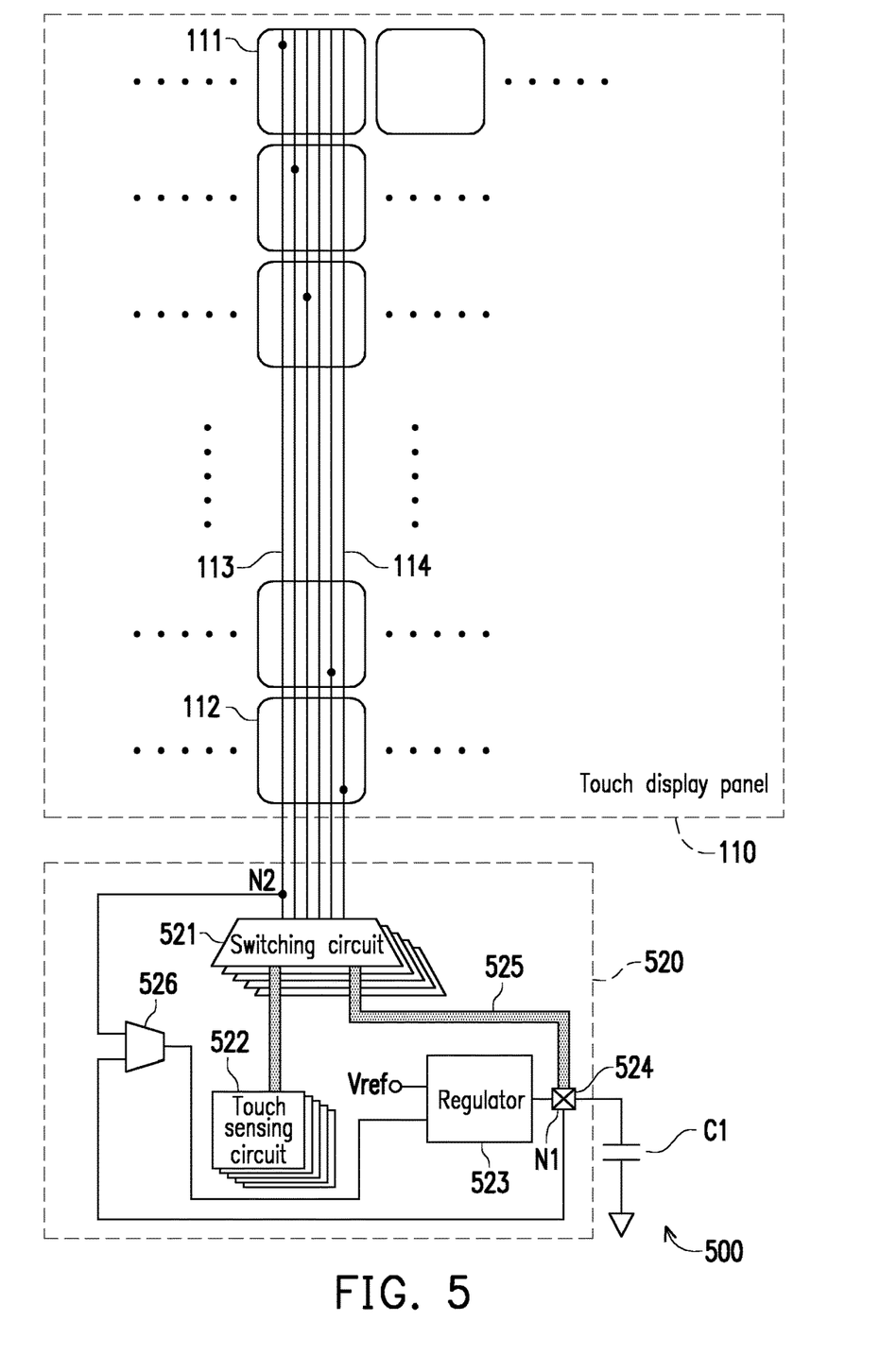
FIG. 5 is a schematic circuit block diagram illustrating a touch apparatus according to another embodiment of the invention.

FIG. 5 is a schematic circuit block diagram illustrating a touch apparatus 500 according to another embodiment of the invention. The touch display apparatus 500 illustrated in FIG. 5 includes a touch display panel 110 and an integrated circuit 520. An ILB pad 524 of the integrated circuit 520 is coupled to a regulation capacitor C1 on a printed circuit. The touch display panel 110, the ILB pad 524 and the regulation capacitor C1 may be inferred with reference to the descriptions related to the touch display panel 110, the ILB pad 124 and the regulation capacitor C1 illustrated in FIG. 1 and thus, will not repeated.

In the embodiment illustrated in FIG. 5, the integrated circuit 520 includes a switching circuit 521, a touch sensing circuit 522, a regulator 523 and a switching circuit 526. A common terminal of the switching circuit 521 is coupled to a common voltage line of the touch display panel 110. The common voltage line is coupled to at least one of the one common electrodes (e.g., the common electrode 111) of the touch display panel. A first terminal of a wire 525 is coupled to the first node N1. A second terminal of the wire 525 is coupled to a first terminal of the switching circuit 521. Thus, a first selection terminal of the switching circuit 521 may receive a common voltage generated by the regulator 523.

The touch sensing circuit 522 is coupled to a second selection terminal of the switching circuit 521. In the touch sensing period, the switching circuit 521 is configured to be switched to couple the common voltage line of the touch display panel 110 to the touch sensing circuit 522. In this circumstance, the touch sensing circuit 522 may sense whether a touch event occurs to the touch display panel 110 through the switching circuit 521, the common voltage line and the common electrode (e.g., the common electrode 111). In the display driving period, the switching circuit 521 is configured to be switched to couple the common voltage line of the touch display panel 110 to the first node N1 to receive the common voltage provided by the regulator 523. The switching circuit 521, the touch sensing circuit 522 and the regulator 523 illustrated in FIG. 5 may be inferred with reference to the descriptions related to the switching circuit 421, the touch sensing circuit 422 and the regulator 423 and thus, will not repeated.

In the embodiment illustrated in FIG. 5, the second node N2 is directly coupled to the common voltage line 113 of the touch display panel 110, and the common voltage line 113 is coupled to at least one of the one common electrodes (e.g., the common electrode 111) of the touch display panel 110. Alternatively, a common terminal of the switching circuit 521 may be employed as the second node N2. In the display driving period, the second terminal of the wire 525 is coupled to the second node N2 through the switching circuit 521. Thus, the common voltage may be transmitted by the wire 525 from the first node N1 to the common electrode (e.g., the common electrode 111) of the touch display panel 110 through the switching circuit 521 and the second node N2.

In the embodiment illustrated in FIG. 5, a first selection terminal of the switching circuit 526 is coupled to the common terminal (i.e., the second node N2) of the switching circuit 521 and the common voltage line 113 of the touch display panel 110. A common terminal of the switching circuit 526 is coupled to an input terminal (i.e., a feedback voltage terminal) of the regulator 523. A second selection terminal of the switching circuit 526 is coupled to the first node N1 (i.e., the ILB pad 524). In the display driving period, the switching circuit 526 is configured to be switched to couple the input terminal (i.e., the feedback voltage terminal) of the regulator 523 to the common terminal (i.e., the second node N2) of the switching circuit 521 and the common voltage line 113 of the touch display panel 110. In the touch sensing period, the switching circuit 526 is configured to be switched to couple input terminal (i.e., the feedback voltage terminal) of the regulator 523 to the first node N1. The switching circuit 526 may be implemented by using any routing circuit based on a design requirement. For instance, in some embodiments, the switching circuit 526 illustrated in FIG. 5 may be a multiplexer, a switch or any other routing circuit/element.

It should be noted that by being compared to the common voltage of the first node N1, the voltage level of the second node N2 illustrated in FIG. 5 is nearer to the voltage level at the common electrode 111. In comparison with the circuit illustrated in FIG. 1, the coupling node (i.e., the second node N2) of the input terminal (i.e., the feedback voltage terminal) of the regulator 523 in the integrated circuit 520 is nearer to the common electrode 111 of the touch display panel 110. Thus, in the embodiment illustrated in FIG. 5, the settle time of the common electrode 111 of the touch display panel 110 may be shortened.

Figure 6:
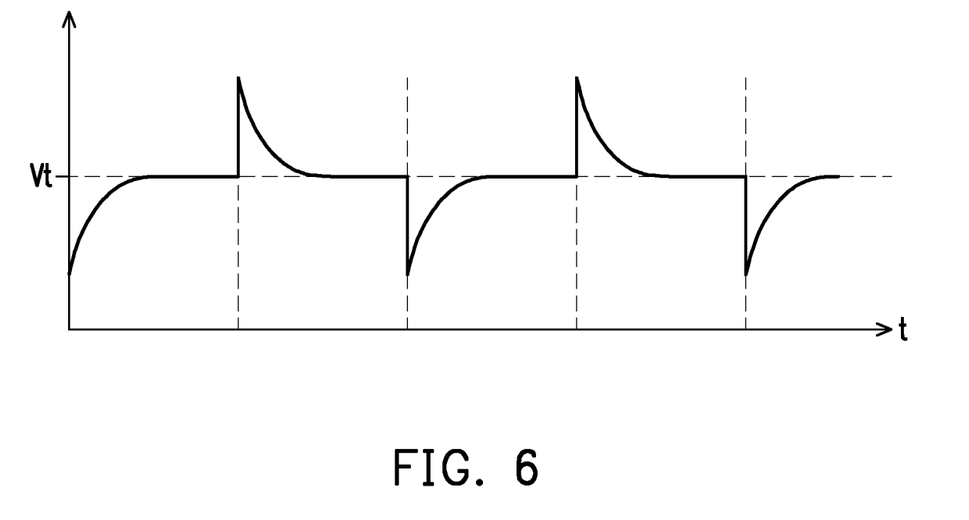
FIG. 6 is a schematic waveform diagram illustrating the voltage of the common electrode near the integrated circuit as depicted in FIG. 4 (or FIG. 5) according to an embodiment of the invention.

FIG. 6 is a schematic waveform diagram illustrating the voltage of the common electrode (i.e., the common electrode 112) near the integrated circuit 120 as depicted in FIG. 4 (or FIG. 5) according to an embodiment of the invention. In FIG. 6, the horizontal axis represents the time t, and the vertical axis represents voltage levels. In comparison with the voltage waveform illustrated in FIG. 2, the settling time represented by the voltage waveform illustrated in FIG. 6 is shorter.

Figure 7:
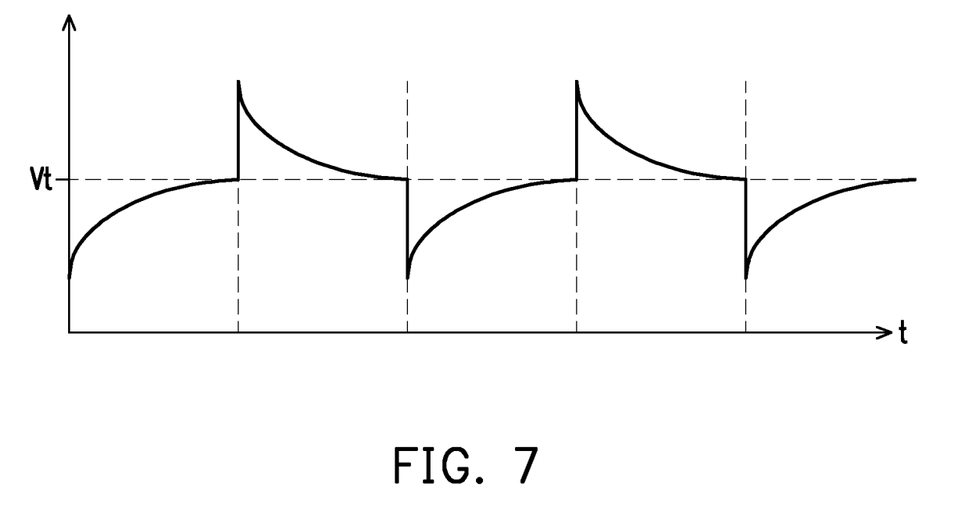
FIG. 7 is a schematic waveform diagram illustrating the voltage of the common electrode far away from the integrated circuit as depicted in FIG. 4 (or FIG. 5) according to an embodiment of the invention.

FIG. 7 is a schematic waveform diagram illustrating the voltage of the common electrode far away from the integrated circuit 120 as depicted in FIG. 4 (or FIG. 5) according to an embodiment of the invention. In FIG. 7, the horizontal axis represents the time t, and the vertical axis represents voltage levels. In comparison with the voltage waveform illustrated in FIG. 3, the settling time represented by the voltage waveform illustrated in FIG. 7 is shorter. As the settling time of the common voltage 111 is shortened, the voltage of the common electrode 111 may be immediately stabilized (return to the target voltage level Vt), as illustrated in FIG. 7.

Based on the above, in the integrated circuit and the touch display apparatus of the embodiments of the invention, the coupling node of the input terminal of the regulator in the integrated circuit can be set to be near to the common electrode of the touch display panel as much as possible. Thus, the settle time of the common electrode of the touch display panel can be shortened.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An integrated circuit, configured to drive a touch display panel, comprising:
   a regulator, having an output terminal employed as a first node to output a common voltage, wherein the common voltage is configured to be provided to at least one common electrode of the touch display panel, and an input terminal of the regulator is coupled to a second node different from the first node to receive a feedback voltage,
   wherein the first node is electrically coupled to the second node, and the common voltage is transmitted to the at least one common electrode of the touch display panel through the first node and the second node.

2. The integrated circuit according to claim 1, wherein by being compared to the common voltage provided by the first node, a level of a voltage provided by the second node is nearer to a level of a voltage occurring at the at least one common electrode.

3. The integrated circuit according to claim 1, wherein the second node is directly coupled to a common voltage line, and the common voltage line is coupled to the at least one common electrode of the touch display panel.

4. The integrated circuit according to claim 1, further comprising:
   a first switching circuit, having a first selection terminal configured to receive the common voltage generated by the regulator and a common terminal coupled to a common voltage line, wherein the common voltage line is coupled to the at least one common electrode of the touch display panel.

5. The integrated circuit according to claim 4, further comprising:
   a wire, having a first terminal coupled to the first node and a second terminal coupled to the first selection terminal.

6. The integrated circuit according to claim 4, wherein the first selection terminal of the first switching circuit is employed as the second node.

7. The integrated circuit according to claim 4, wherein the common terminal of the first switching circuit is employed as the second node.

8. The integrated circuit according to claim 4, further comprising:
   a touch sensing circuit, coupled to a second selection terminal of the first switching circuit.

9. The integrated circuit according to claim 8, wherein in a touch sensing period, the first switching circuit is configured to be switched to couple the common voltage line to the touch sensing circuit, and the touch sensing circuit senses whether a touch event occurs to the touch display panel through the first switching circuit and the common voltage line.

10. The integrated circuit according to claim 8, wherein in a display driving period, the first switching circuit is configured to be switched to couple the common voltage line to the first node to receive the common voltage.

11. The integrated circuit according to claim 4, further comprising:
a second switching circuit, having a first selection terminal coupled to the common terminal of the first switching circuit and the common voltage line of the touch display panel, wherein a common terminal of the second switching circuit is coupled to the input terminal of the regulator, and a second selection terminal of the second switching circuit is coupled to the first node.

12. The integrated circuit according to claim 11, wherein in a display driving period, the second switching circuit is configured to be switched to couple the input terminal of the regulator to the common terminal of the first switching circuit and the common voltage line of the touch display panel.

13. The integrated circuit according to claim 11, wherein in a touch sensing period, the second switching circuit is configured to be switched to couple the input terminal of the regulator to the first node.

14. An integrated circuit, configured to drive a touch display panel, comprising:
a regulator, having an output terminal employed as a first node to output a common voltage, wherein the common voltage is configured to be provided to at least one common electrode of the touch display panel, and an input terminal of the regulator is coupled to a second node different from the first node to receive a feedback voltage, wherein the second node is directly coupled to the first node.

15. The integrated circuit according to claim 14, further comprising:
a wire, configured to transmit the common voltage from the first node and the second node to the at least one common electrode of the touch display panel, wherein the wire has a first terminal coupled to the first node and a second terminal employed as or coupled to the second node.

16. A touch display apparatus, comprising:
a touch display panel; and
an integrated circuit, comprising a regulator, wherein the regulator has an output terminal employed as a first node to output a common voltage, the common voltage is configured to be provided to at least one common electrode of the touch display panel, and an input terminal of the regulator is coupled to a second node different from the first node to receive a feedback voltage,
wherein the first node is electrically coupled to the second node, and the common voltage is transmitted to the at least one common electrode of the touch display panel through the first node and the second node.

17. The touch display apparatus according to claim 16, wherein by being compared to the common voltage provided by the first node, a level of a voltage provided by the second node is nearer to a level of a voltage occurring at the at least one common electrode.

18. The touch display apparatus according to claim 16, wherein the second node is directly coupled to the first node.

19. The touch display apparatus according to claim 18, wherein the integrated circuit further comprises:
a wire, configured to transmit the common voltage from the first node and the second node to the at least one common electrode of the touch display panel, wherein the wire has a first terminal coupled to the first node and a second terminal employed as or coupled to the second node.

20. The touch display apparatus according to claim 16, wherein the second node is directly coupled to a common voltage line, and the common voltage line is coupled to the at least one common electrode of the touch display panel.

21. The touch display apparatus according to claim 16, wherein the integrated circuit further comprises:
a first switching circuit, having a first selection terminal configured to receive the common voltage generated by the regulator and a common terminal coupled to a common voltage line, wherein the common voltage line is coupled to the at least one common electrode of the touch display panel.

22. The touch display apparatus according to claim 21, wherein the integrated circuit further comprises:
a wire, having a first terminal coupled to the first node and a second terminal coupled to the first selection terminal.

23. The touch display apparatus according to claim 21, wherein the first selection terminal of the first switching circuit is employed as the second node.

24. The touch display apparatus according to claim 21, wherein the common terminal of the first switching circuit is employed as the second node.

25. The touch display apparatus according to claim 21, wherein the integrated circuit further comprises:
a touch sensing circuit, coupled to a second selection terminal of the first switching circuit.

26. The touch display apparatus according to claim 25, wherein in a touch sensing period, the first switching circuit is configured to be switched to couple the common voltage line to the touch sensing circuit, and the touch sensing circuit senses whether a touch event occurs to the touch display panel through the first switching circuit and the common voltage line.

27. The touch display apparatus according to claim 25, wherein in a display driving period, the first switching circuit is configured to be switched to couple the common voltage line to the first node to receive the common voltage.

28. The touch display apparatus according to claim 21, wherein the integrated circuit further comprises:
a second switching circuit, having a first selection terminal coupled to the common terminal of the first switching circuit and the common voltage line of the touch display panel, wherein a common terminal of the second switching circuit is coupled to the input terminal of the regulator, and a second selection terminal of the second switching circuit is coupled to the first node.

29. The touch display apparatus according to claim 28, wherein in a display driving period, the second switching circuit is configured to be switched to couple the input terminal of the regulator to the common terminal of the first switching circuit and the common voltage line of the touch display panel.

30. The touch display apparatus according to claim 28, wherein in a touch sensing period, the second switching circuit is configured to be switched to couple the input terminal of the regulator to the first node.

* * * * *